United States Patent
Kim et al.

(10) Patent No.: US 9,787,147 B2
(45) Date of Patent: Oct. 10, 2017

(54) INTERIOR PERMANENT MAGNET MOTOR

(75) Inventors: Deok Geun Kim, Seongnam-si (KR); Han Sam Cho, Seongnam-si (KR); Kyu Yun Hwang, Seongnam-si (KR)

(73) Assignee: Komotek Co., Ltd., Seongnam-si (KR)

( * ) Notice: Subject to any disclaimer, the term of this patent is extended or adjusted under 35 U.S.C. 154(b) by 484 days.

(21) Appl. No.: 14/358,159

(22) PCT Filed: Jun. 26, 2012

(86) PCT No.: PCT/KR2012/005016
§ 371 (c)(1),
(2), (4) Date: Aug. 20, 2014

(87) PCT Pub. No.: WO2013/073756
PCT Pub. Date: May 23, 2013

(65) Prior Publication Data
US 2015/0028707 A1    Jan. 29, 2015

(30) Foreign Application Priority Data

Nov. 16, 2011  (KR) .................. 10-2011-0119769

(51) Int. Cl.
*H02K 1/02*  (2006.01)
*H02K 1/27*  (2006.01)

(52) U.S. Cl.
CPC ............ *H02K 1/2706* (2013.01); *H02K 1/02* (2013.01); *H02K 1/2773* (2013.01); *H02K 2213/03* (2013.01)

(58) Field of Classification Search
CPC ........ H02K 1/02; H02K 1/276; H02K 1/2766; H02K 1/2773; H02K 1/04; H02K 1/06; H02K 1/272; H02K 1/274; H02K 1/2753; H02K 1/223; H02K 21/042
USPC ...................................... 310/156.56
See application file for complete search history.

(56) References Cited

U.S. PATENT DOCUMENTS

| | | | |
|---|---|---|---|
| 5,829,120 A * | 11/1998 | Uchida | H02K 1/2773 29/598 |
| 5,986,374 A | 11/1999 | Kawakami | |
| 6,359,359 B1 * | 3/2002 | Miura | H02K 1/276 310/156.08 |
| 6,847,143 B1 | 1/2005 | Akemakou | |
| 7,550,889 B2 | 6/2009 | Horst | |
| 2007/0138892 A1 * | 6/2007 | Horst | H02K 1/2766 310/156.53 |

(Continued)

FOREIGN PATENT DOCUMENTS

| | | | | |
|---|---|---|---|---|
| CH | WO 2009027938 A2 * | 3/2009 | ............. | H02K 1/246 |
| DE | 102009025929 A1 * | 12/2010 | ........... | H02K 1/2773 |

(Continued)

*Primary Examiner* — Quyen Leung
*Assistant Examiner* — Eric Johnson
(74) *Attorney, Agent, or Firm* — The Webb Law Firm (57) ABSTRACT

An interior permanent magnet motor includes a stator having teeth on which a coil is wound, a rotor rotatably provided inside the stator, the rotor including a plurality of rotor sectors, and at least two permanent magnet recesses formed between the rotor sectors. Ferrite permanent magnets are embedded in predetermined ones of the permanent magnet recesses that are formed in an inner portion of the rotor. Rare-earth permanent magnets are embedded in the other ones of the permanent magnet recesses that are formed in an outer portion of the rotor.

16 Claims, 6 Drawing Sheets

(56) References Cited

U.S. PATENT DOCUMENTS

| | | | | |
|---|---|---|---|---|
| 2007/0252468 A1* | 11/2007 | Lee | ................. | H02K 1/276 310/156.53 |
| 2010/0277028 A1* | 11/2010 | Alexander | ........... | H02K 1/2773 310/156.51 |
| 2011/0115328 A1* | 5/2011 | Nakayama | ........... | H02K 1/2766 310/156.53 |
| 2013/0241340 A1* | 9/2013 | Koga | ................... | H02K 1/2773 310/156.56 |
| 2014/0054897 A1* | 2/2014 | Casazza | .................. | H02K 1/32 290/55 |
| 2015/0180295 A1* | 6/2015 | Casazza | .................. | H02K 1/32 290/55 |
| 2016/0028281 A1* | 1/2016 | Hao | ..................... | H02K 1/2766 310/156.56 |

FOREIGN PATENT DOCUMENTS

| | | | |
|---|---|---|---|
| JP | 6248243 | A | 3/1987 |
| JP | 9205746 | A | 8/1997 |

* cited by examiner

INTERIOR PERMANENT MAGNET MOTOR

CROSS-REFERENCE TO RELATED APPLICATIONS

This application is the United States national phase of International Application No. PCT/KR2012/005016 filed Jun. 26, 2012, and claims priority to Korean Patent Application No. 10-2011-01197669 filed Nov. 16, 2011, the disclosures of which are hereby incorporated in their entirety by reference.

TECHNICAL FIELD

The present invention relates, in general, to an interior permanent magnet motor and, more particularly, to an interior permanent magnet motor having magnets embedded inside a rotor.

BACKGROUND ART

In general, motors using permanent magnets are divided into surface permanent magnet (SPM) motors, in which magnets are attached to the surface of a rotor, and interior permanent magnet (IPM) motors, in which magnets are embedded inside a rotor. While SPM motors have a complicated structure in order to prevent magnets from flying apart during high-speed rotation, IPM motors do not have such a problem and thus are becoming the major type of motor used.

In IMP motors, the outer portion of the rotor that is adjacent to the stator is more influenced by an armature reaction, and permanent magnets embedded in the outer portion of the rotor are more vulnerable to irreversible demagnetization. In order to prevent the irreversible demagnetization, which occurs in the outer portion of the rotor, a portion of the permanent magnets, which are embedded in the outer portion of the rotor, may be removed. However, this leads to the problem of a decrease in power due to a reduction in the magnetic flux of the permanent magnets.

DISCLOSURE

Technical Problem

Accordingly, the present invention has been devised keeping in mind the above problems occurring in the related art, and is intended to provide an interior permanent magnet motor that prevents irreversible demagnetization due to an armature reaction while compensating for the power of the interior permanent magnet motor.

Technical Solution

In an aspect, the present invention provides a interior permanent magnet motor that includes a stator having teeth on which a coil is wound; a rotor rotatably provided inside the stator, the rotor including a plurality of rotor sectors; at least two permanent magnet recesses formed between the rotor sectors; ferrite permanent magnets embedded in predetermined ones of the permanent magnet recesses that are formed in an inner portion of the rotor; and rare-earth permanent magnets embedded in the other ones of the permanent magnet recesses that are formed in an outer portion of the rotor.

Here, the ferrite permanent magnets may be made of one of barium ferrite and strontium ferrite.

In addition, the rare-earth permanent magnets may be made of one of samarium-cobalt and neodymium.

Here, the permanent magnets, which are embedded in the at least two permanent magnet recesses formed between the rotor sectors, may be arranged radially about the center of the rotor.

In addition, the size of the permanent magnets, which are embedded in the at least two permanent magnet recesses formed between the rotor sectors, may be the same.

Here, it is preferable that, in the permanent magnets, which are embedded in the at least two permanent magnet recesses formed between the rotor sectors, the number of the ferrite permanent magnets be greater than that of the rare-earth permanent magnets.

In addition, the permanent magnets, which are embedded in the at least two permanent magnet recesses formed between the rotor sectors, may decrease in size in a direction toward an outer portion of the rotor.

Here, the permanent magnets, which are embedded in the at least two permanent magnet recesses formed between the rotor sectors, may decrease in width in a direction toward an outer portion of the rotor.

In addition, a partition protruding from a respective side portion of the rotor sectors may be provided between the at least two permanent magnet recesses formed between the rotor sectors.

Furthermore, the partition may be formed integrally with the rotor sectors.

Here, the rotor sectors may include first and second rotor sectors, which are adjacent to each other, and a first partition formed in the first rotor sector and a second partition formed in the second rotor sector are spaced apart from each other at a predetermined interval and face each other.

In addition, both ends of the partition, which is provided between first and second rotor sectors, may be connected respectively to the first and second rotor sectors.

In another aspect, the present invention provides an interior permanent magnet motor that includes a stator having teeth on which a coil is wound; a rotor rotatably provided inside the stator, the rotor including a plurality of rotor sectors; and a first recess and a second recess formed between the rotor sectors, wherein a ferrite permanent magnet is embedded in the first recess, and a rare-earth permanent magnet is embedded in the second recess. The second recess is located outer than the first recess, and the size of the second recess is smaller than that of the first recess.

In addition, the width of the second recess may be smaller than that of the first recess.

Here, the first and second recesses may be arranged radially about the center of the rotor.

In addition, a partition protruding from a respective side portion of the rotor sectors may be provided between the first recess and the second recess.

Here, the rotor sectors include first and second rotor sectors, which are adjacent to each other, and a first partition formed in the first rotor sector and a second partition formed in the second rotor sector may be spaced apart from each other at a predetermined interval while facing each other.

In addition, both ends of the partition, which is provided between first and second rotor sectors, may be connected respectively to the first and second rotor sectors.

Here, the partition may be formed integrally with the rotor sectors.

Advantageous Effects

As described above, according to embodiments of the invention, the interior permanent magnet motor has the ferrite permanent magnets embedded in the inner portion of the rotor and the rare-earth permanent magnets embedded in the outer portion of the rotor, and thus can prevent irreversible demagnetization due to an armature reaction while compensating for the power of the interior permanent magnet motor.

MODE FOR INVENTION

Hereinbelow, exemplary embodiments of the present invention will be described in detail with reference to the accompanying drawings.

Figure 1:
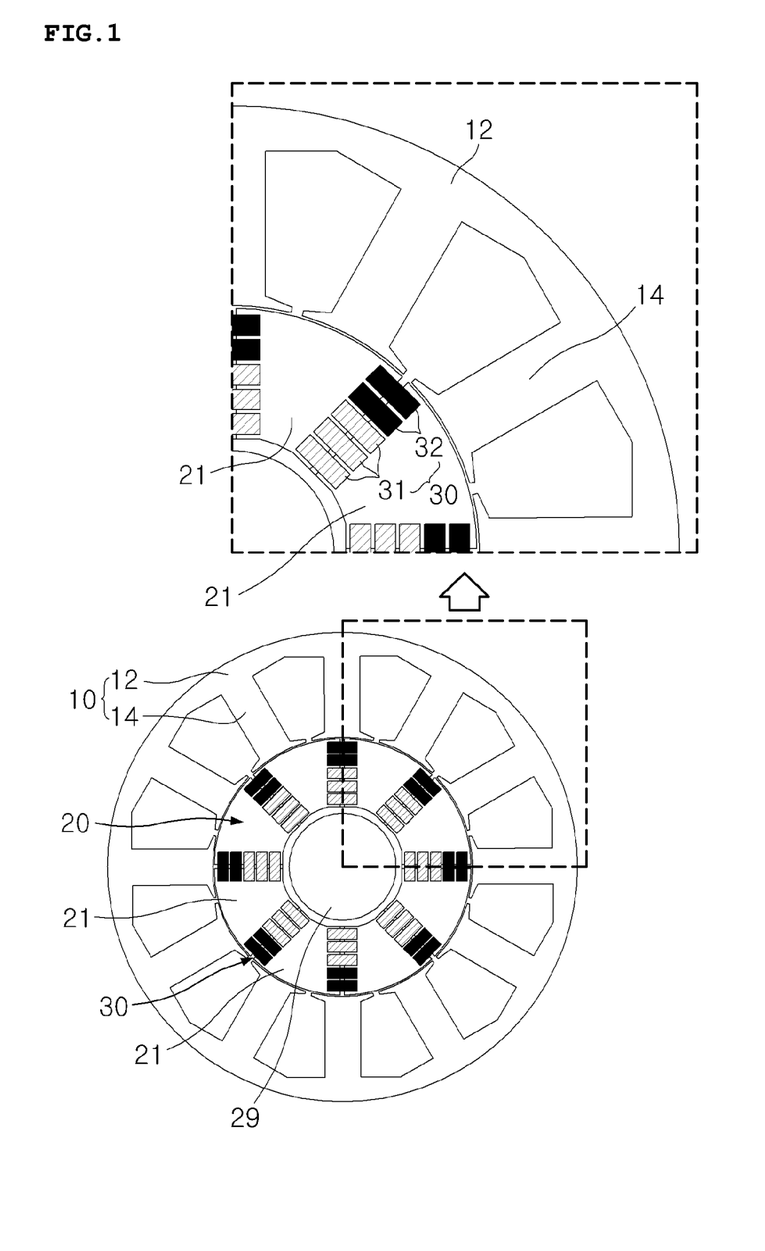
FIG. 1 is a cross-sectional view showing an interior permanent magnet motor according to a first embodiment of the invention.
Figure 2:
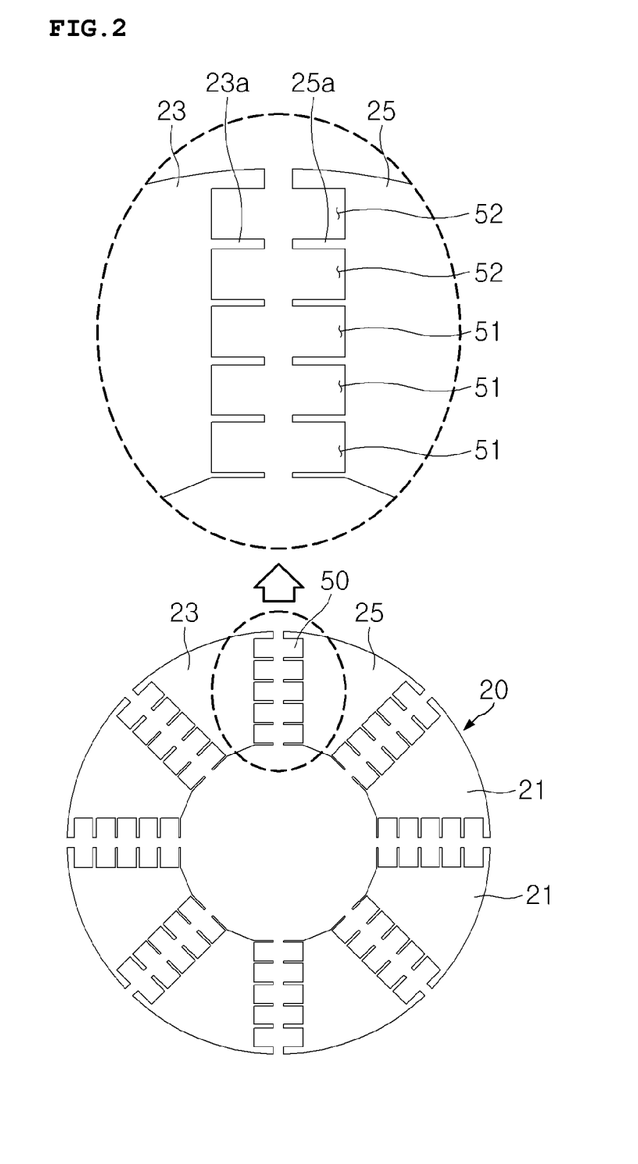
FIG. 2 is a cross-sectional view showing the interior permanent magnet motor shown in FIG. 1.

FIG. 1 is a cross-sectional view showing an interior permanent magnet motor according to a first embodiment of the invention, and FIG. 2 is a cross-sectional view showing the interior permanent magnet motor shown in FIG. 1.

Referring to FIG. 1 and FIG. 2, the interior permanent magnet motor according to the first embodiment of the invention includes a stator 10 having teeth 14, which are wound on a coil (not shown). The interior permanent magnet motor may also include a rotor 20, which is rotatably provided inside the stator 10. The interior permanent magnet motor may also include permanent magnets 30, which are embedded inside the rotor 20. The permanent magnets 30 may include ferrite permanent magnets 31 and rare-earth permanent magnets 32. The ferrite permanent magnets 31 may be barium (Ba) ferrite permanent magnets or strontium (Sr) ferrite permanent magnets. The rare-earth permanent magnets 32 may be samarium-cobalt (Sm—Co) permanent magnets or neodymium (Nd) permanent magnets. The rotor may be made of iron (Fe).

The stator 10 includes an annular frame 12 and a plurality of teeth 14 connected to the frame 12. The teeth 14 may have a 'T' shape, and be oriented towards the inside of the frame 12. The teeth 14 are wound with a coil, which generates an electric field when power is applied thereto. The teeth 14 may be arranged such that they are spaced apart from each other at predetermined intervals. The frame 12 and the teeth 14 may be integrally formed.

The rotor 20 is provided rotatably inside the stator 10. The rotor 20 has a semicircular shape, and is provided with a rotor shaft 22 at the center thereof. Consequently, the rotor 20 can rotate about the rotor shaft 22. The rotor 20 is arranged such that it is spaced apart from the inner end of the teeth 14 at a predetermined interval t.

The rotor 20 includes a plurality of rotor sectors 21. The rotor sectors 21 may be provided such that they are spaced apart from each other. The rotor sectors 21 are spaced apart from each other at predetermined intervals. Each rotor sector 21 may be fan-shaped. Referring to FIG. 2, at least two permanent magnet recesses 50, in which the permanent magnets 30 are embedded, are formed between adjacent rotor sectors 21. The permanent magnet recesses 50 include at least one first recess 51 where the ferrite permanent magnets 31 are embedded and at least one second recess 52 where the rare-earth permanent magnets 32 are embedded. Here, the first recess 51 is formed in the inner portion of the rotor, and the second recess 52 is formed in the outer portion of the rotor. The first and second recesses 51 and 52 are formed radially about the rotor shaft 29. Therefore, the permanent magnets 30 embedded in the first and second recesses 51 and 52 are arranged radially about the center of the rotor.

According to this embodiment, the size of the first recess 51 may be the same as that of the second recess 52. Therefore, the permanent magnets 30 embedded in the first and second recesses 51 and 52 may have the same size.

In the meantime, it is preferable that partitions 23a and 25a be provided between the at least two permanent magnet recesses 50. The partitions 23a and 25a space the permanent magnets 30, which are embedded in the permanent magnet recesses 50, apart from each other, and prevent the permanent magnets 30, which are embedded in the permanent magnet recesses 50, from becoming dislodged. The partitions 23a and 25a protrude from side portions of a corresponding rotor sector 21. In addition, it is preferable that the partitions 23a and 25a be formed integrally with the rotor sector 21. According to this embodiment, in a first rotor sector 23 and a second rotor sector 25, which are adjacent to each other, each first partition 23a formed in the first rotor sector 23 and each second partition 25a formed in the second rotor sector 25 are spaced apart from each other at a predetermined interval while facing each other. Therefore, the first rotor sector 23 and the second rotor sector 25, which are adjacent to each other, are separated from each other, and a plurality of rotor sectors 21, which form the rotor 20, are separated from each other.

The number of the first recesses 51, which are formed between the rotor sectors 21, is greater than that of the second recesses 52. That is, it is preferable that the number of the ferrite permanent magnets 31, which are embedded between the rotor sectors 21, be greater than that of the rare-earth permanent magnets 32. In addition, the first recesses 51 are closer to the rotor shaft 29 than are the second recesses 52. That is, in the at least one ferrite permanent magnet 31 and the at least one rare-earth permanent magnet 32, which are embedded between the rotor sectors 21, the ferrite permanent magnets 31 are closer to the rotor shaft 29 (that is, are disposed in the inner portion of the rotor 20), and the rare-earth permanent magnets 32 are disposed in the outer portion of the rotor 20. This embodiment is described with respect to the case in which three first recesses 51 and two second recesses 52 are formed between the rotor sectors 21. However, this is not intended to be limiting, but the recesses may include one second recess 52 formed in the outermost portion of the rotor 20 and a plurality of first recesses 51 formed in the remaining portions of the rotor 20. In this embodiment, it is preferable that the size of the first recess 51 be the same as that of the second recess 52. The ferrite permanent magnets 31 are embedded in the first recesses 51, and the rare-earth permanent magnets 32 are embedded in the second recesses 52. The three first recesses 51 are provided such that they are arranged sequentially from the portion that is closest to the rotor shaft 29, and the two second recesses 52 are provided such that they are arranged sequentially from the outermost portion of the rotor 20. When a plurality of permanent magnet recesses 50 is provided, a designer determines the number of the ferrite permanent magnets 31 and the number of rare-earth permanent magnets 32, which are embedded in a plurality of permanent magnet recesses 50. Here, the three ferrite permanent magnets 31 are embedded in the permanent magnet recesses 50, which are formed in the inner portion of the rotor 20, sequentially in the direction from the innermost to the outside, and the two rare-earth permanent magnets 32 are embedded in the outer permanent magnet recesses 50, which are formed in the outer portion of the rotor 20, sequentially in the direction from the inside to the outside. Here, it is preferable that the number of the first recesses 51 in which the ferrite permanent magnets 31 are embedded be greater than that of the second recesses 52 in which the rare-earth permanent magnets 32 are embedded. Therefore, the number of the ferrite permanent magnets 31, which are embedded between the rotor sectors 21, is greater than that of the rare-earth permanent magnets 32.

Figure 3:
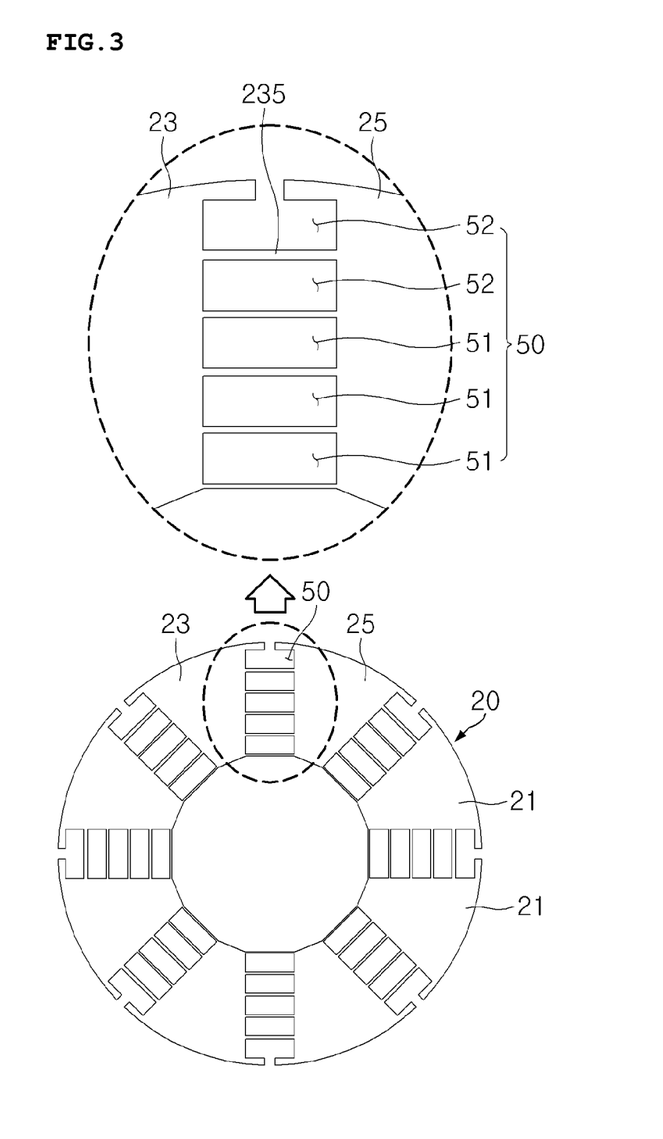
FIG. 3 is a cross-sectional view showing an interior permanent magnet motor according to a second embodiment of the invention.

A description will be given below of a second embodiment of the invention with reference to FIG. 3. A description of some components and functions will be omitted from the following when they are identical to those of the above-described first embodiment of the invention. The same reference numerals are used to designate the same components.

According to the second embodiment of the invention, a plurality of rotor sectors 21 of the rotor 20 is provided integrally. At least two permanent magnet recesses 50 are formed between the rotor sectors 21, and partitions 235 are provided between the permanent magnet recesses 50. Here, a partition 235 is provided between each first rotor sector 23 and each second rotor sector 25, which are adjacent to each other, and both ends of the partition 235 are connected respectively to the first rotor sector 23 and the second rotor sector 25, which are adjacent to each other. That is, one end of the partition 235 is connected to the first rotor sector 23, and the other end of the partition 235 is connected to the second rotor sector 25. Here, it is preferable that the partition 235 be formed integrally with the first rotor sector 23 and the second rotor sector 25. Therefore, the partition 235, the first rotor sector 23 and the second rotor sector 25 may be connected together, and a plurality of rotor sectors 21, which form a part of the rotor 20, may be formed integrally. Thus, a plurality of rotor sectors 21 are connected to each other and integrated together by the partitions 235.

Figure 4:
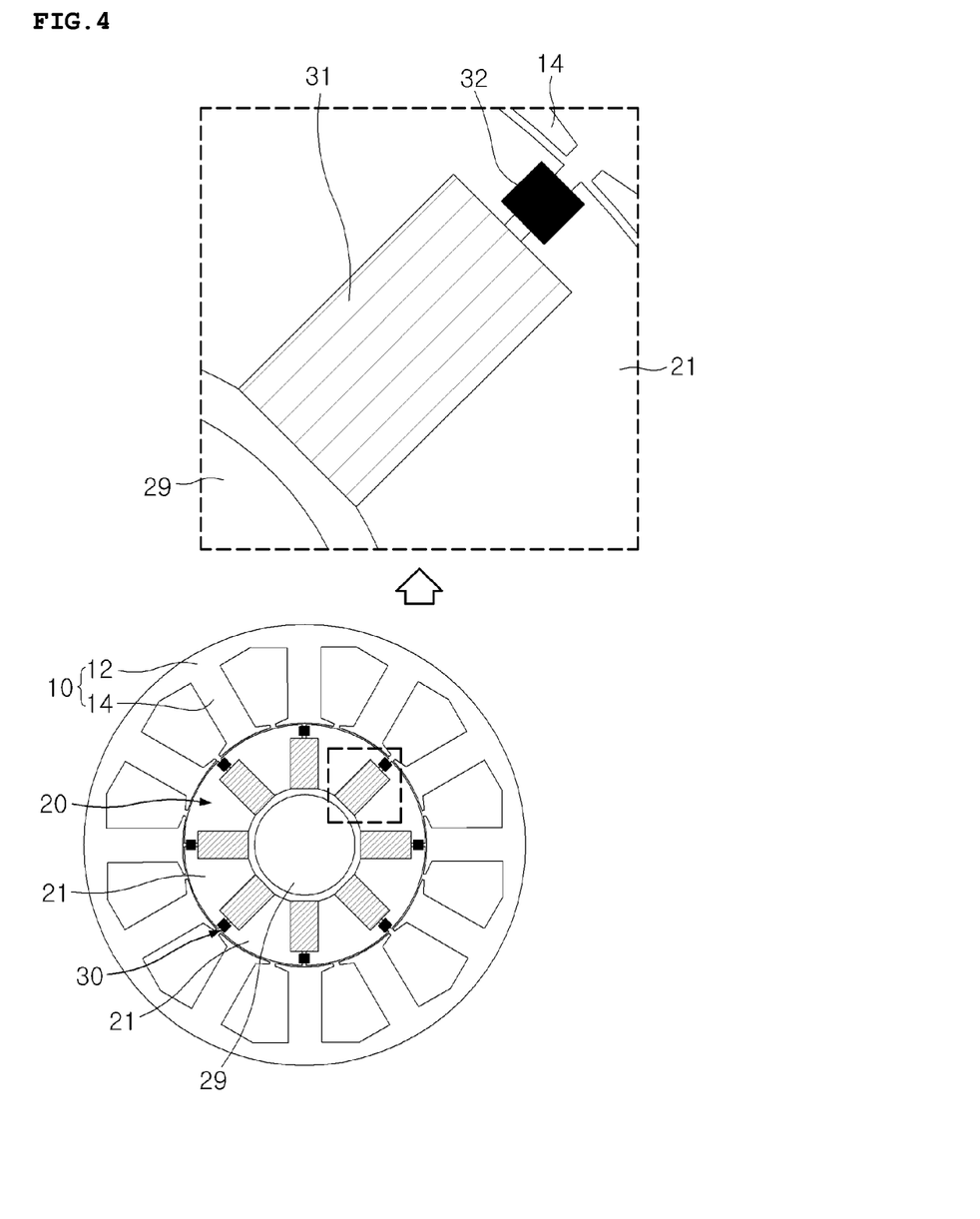
FIG. 4 is a cross-sectional view showing an interior permanent magnet motor according to a third embodiment of the invention.

A description will be given below of a third embodiment of the invention with reference to FIGS. 4 and 5. A description of some components and functions will be omitted from the following when they are identical to those of the above-described first embodiment of the invention. The same reference numerals are used to designate the same components.

The rotor 20 of the interior permanent magnet motor according to this embodiment of the invention includes a plurality of rotor sectors 21. The rotor sectors 21 may be separated from each other. The rotor sectors 21 are spaced apart from each other at predetermined intervals. Each rotor sector 21 may be fan-shaped. At least two permanent magnet recesses 50, in which the permanent magnets 30 are embedded, are formed between adjacent rotor sectors 21. The permanent magnet recesses 50 include at least one first recess 51 in which the ferrite permanent magnets 31 are embedded and at least one second recess 52 in which the rare-earth permanent magnets 32 are embedded. The first and second recesses 51 and 52 are formed radially about a rotor shaft 29. The first recess 51 is formed in the inner portion of the rotor 20, and the second recess 52 is formed in the outer portion of the rotor 20. That is, at least one ferrite permanent magnet 31 is embedded in the inner portion of the rotor 20, and at least one rare-earth permanent magnet 32 is embedded in the outer portion of the rotor 20.

According to this embodiment, the size of the first recess 51 may be greater than that of the second recess 52. In addition, it is preferable that the first and second recesses 51 and 52 be smaller in size in the direction from the inside to the outside of the rotor 20. That is, it is preferable that the size of the permanent magnet 32, which is embedded in the outer portion of the rotor 20, be smaller than that of the permanent magnet 31, which is adjacent to the permanent magnet and is embedded in the inner portion of the rotor 20. Accordingly, the size of ferrite permanent magnets 31 and the rare-earth permanent magnets 32, which are embedded in the rotor 20, decreases in the direction toward the outer portion of the rotor 20. Here, the volume of the first recess 51 is smaller than that of the second recess 52. Preferably, the width W1 of the first recess is smaller than the width W2 of the second recess. Accordingly, the volume of the ferrite permanent magnet 31 embedded in the first recess 51 is smaller than that of the rare-earth permanent magnet 32 embedded in the second recess 52. It is preferable that the width of the ferrite permanent magnet 31 be smaller than that of the rare-earth permanent magnet 32. Since the size of the permanent magnet embedded in the outer portion of the rotor is smaller than that of the permanent magnet embedded in the inner portion of the rotor, there occurs a difference in magnetic resistance between the outer portion and the inner portion of the rotor, which in turn causes a magnetic flux due to an armature reaction to be concentrated to the outer portion of the rotor.

In the interior permanent magnet motor of this embodiment, the respective rotor sectors 21 are separated from each other. It is preferable that partitions 23a and 25a be provided between the first recess 51 and the second recess 52. The partitions 23a and 25a space the permanent magnets 30, which are embedded in the first recess 51 and the second recess 52, apart from each other, and prevent the permanent magnets, which are embedded in the first recess 51 and the second recess 52, from becoming dislodged. The partitions 23a and 25a protrude from side portions of the respective rotor sector 21. It is preferable that the partitions 23a and 25a be formed integrally with the rotor sector 21. According to this embodiment, in first and second rotor sectors 23 and 25, which are adjacent to each other, the first partition 23a formed in the first rotor sector 23 and the second partition 25a formed in the second rotor sector 25 are spaced apart from each other at a predetermined interval while facing each other. Therefore, the first rotor sector 23 and the second rotor sector 25, which are adjacent to each other, are separated from each other, and a plurality of rotor sectors 21, which form the rotor 20, are separated from each other.

Figure 5:
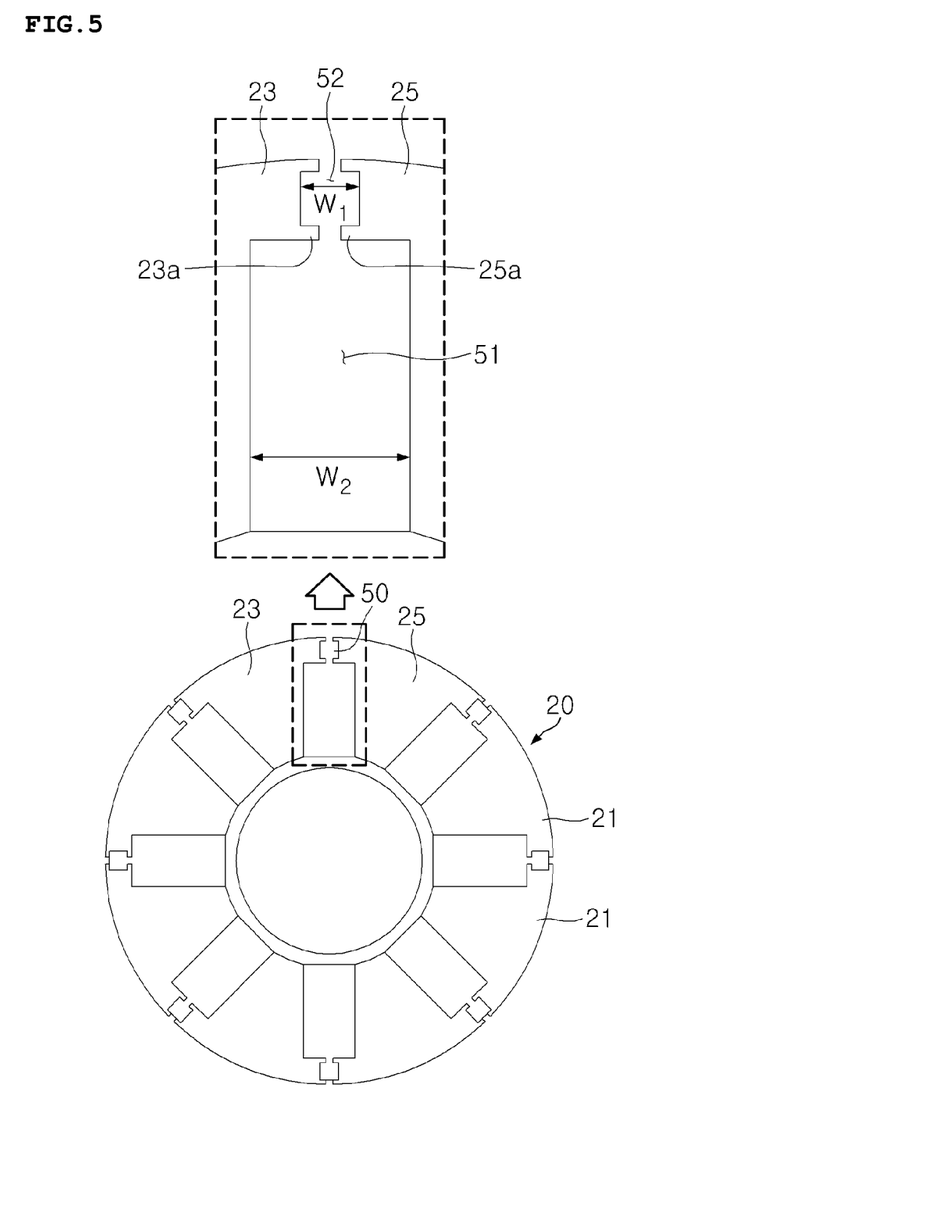
FIG. 5 is a cross-sectional view showing the interior permanent magnet motor shown in FIG. 4.

FIG. 5 shows an example of the interior permanent magnet motor according to the third embodiment of the invention, in which are formed one first recess 51 with the ferrite permanent magnets 31 being embedded therein and one second recess 52 with the rare-earth permanent magnets 32 being embedded therein. Here, the size of the second recesses 52, which is provided in the outer portion of the rotor 20, is smaller than that of the first recess 51. It is preferable that the size of the rare-earth permanent magnet 32, which is embedded in the rotor 20, be smaller than that of the ferrite permanent magnet 31. Here, the first recess 51 in which the ferrite permanent magnet 31 is embedded is formed in the inner portion of the rotor 20, and the second recess 52 in which the rare-earth permanent magnet 32 is embedded is formed in the outer portion of the rotor 20. In addition, it is preferable that the size of the rare-earth permanent magnet 32 embedded in the outer portion of the rotor 20 be smaller than that of the ferrite permanent magnet 31 embedded in the inner portion of the rotor 20.

In the case of the interior permanent magnet motor, an armature reaction is more effective around the outer portion of the rotor that is adjacent to the stator, and the permanent magnet that is embedded in the outer portion is more vulnerable to irreversible demagnetization. In order to prevent the irreversible demagnetization, which occurs in the outer portion of the rotor, a portion of the permanent magnets, which are embedded in the outer portion of the rotor, may be removed. However, this may unfortunately decrease the magnetic flux of the permanent magnets, thereby reducing power. This embodiment of the invention can compensate for the irreversible demagnetization due to the armature reaction and compensate for the power of the interior permanent magnet motor by embedding the ferrite permanent magnet in the inner portion of the rotor and the rare-earth permanent magnet, which is smaller than the ferrite permanent magnet, in the outer portion of the rotor.

Figure 6:
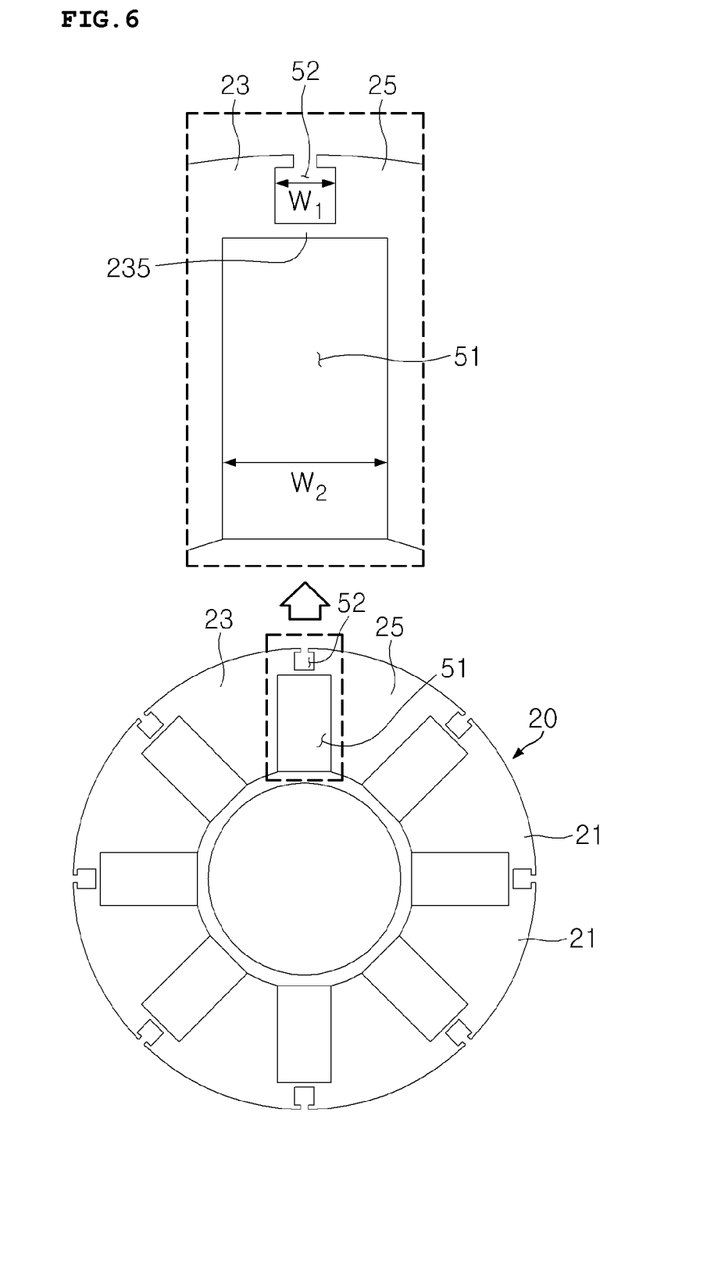
FIG. 6 is a cross-sectional view showing an interior permanent magnet motor according to a fourth embodiment of the invention.

A description will be given below of a fourth embodiment of the invention with reference to FIG. 6. A description of some components and functions will be omitted from the following when they are identical to those of the above-described third embodiment of the invention.

According to the fourth embodiment of the invention, a plurality of rotor sectors 21, which form a part of the rotor 20, is provided integrally. At least two permanent magnet recesses 50 are formed between the rotor sectors 21, and partitions 235 are provided between the permanent magnet recesses 50. Here, each partition 235 is provided between a first rotor sector 23 and a second rotor sector 25, which are adjacent to each other, and both ends of the partition 235 are connected respectively to the first rotor sector 23 and the second rotor sector 25, which are adjacent to each other. That is, one end of the partition 235 is connected to the first rotor sector 23, and the other end of the partition 235 is connected to the second rotor sector 25. Here, it is preferable that the partition 235 be formed integrally with the first rotor sector 23 and the second rotor sector 25. Therefore, the partition 235, the first rotor sector 23 and the second rotor sector 25 are connected together, and a plurality of rotor sectors 21, which form a part of the rotor 20, may be formed integrally. Thus, a plurality of rotor sectors 21 are connected to each other and integrated together by the partitions 235.

Although the embodiments of the present invention have been disclosed with reference to the certain embodiments and drawings, the present invention is not limited thereto. Those skilled in the art will appreciate that various modifications, additions and substitutions are possible, without departing from the scope and spirit of the invention as disclosed in the accompanying claims and the equivalents thereof.

The invention claimed is:

1. An interior permanent magnet motor comprising:
a stator having teeth on which a coil is wound;
a rotor rotatably provided inside the stator, the rotor comprising a plurality of rotor sectors arranged circumferentially about the center of the rotor;
at least two permanent magnet recesses formed between the rotor sectors;
ferrite permanent magnets embedded in predetermined ones of the permanent magnet recesses that are formed in a radially inner portion of the rotor; and
rare-earth permanent magnets embedded in the other ones of the permanent magnet recesses that are formed in a radially outer portion of the rotor;
wherein the permanent magnets, which are embedded in the at least two permanent magnet recesses formed between the rotor sectors, are arranged radially about the center of the rotor,
wherein the permanent magnets are radially spaced from each other by partitions that protrude circumferentially from side portions of corresponding rotor sectors and which are circumferentially spaced apart from each other while facing each other.

2. The interior permanent magnet motor of claim 1, wherein the ferrite permanent magnets are made of one of barium ferrite and strontium ferrite.

3. The interior permanent magnet motor of claim 1, wherein the rare-earth permanent magnets are made of one of samarium-cobalt and neodymium.

4. The interior permanent magnet motor of claim 1, wherein the size of the permanent magnets, which are embedded in the at least two permanent magnet recesses formed between the rotor sectors, is the same.

5. The interior permanent magnet motor of claim 4, wherein, five permanent magnet recesses are formed between the rotor sectors; and the number of the ferrite permanent magnets is greater than that of the rare-earth permanent magnets.

6. The interior permanent magnet motor of claim 1, wherein the permanent magnets, which are embedded in the at least two permanent magnet recesses formed between the rotor sectors, decrease in size in a radial direction towards the radially outer portion of the rotor.

7. The interior permanent magnet motor of claim 1, wherein the permanent magnets, which are embedded in the at least two permanent magnet recesses formed between the rotor sectors, decrease in width in a radial direction towards the radially outer portion of the rotor.

8. The interior permanent magnet motor of claim 1, wherein the partitions that protrude from the side portions of the rotor sectors are provided between the at least two permanent magnet recesses formed between the rotor sectors.

9. The interior permanent magnet motor of claim 8, wherein the partitions are formed integrally with the rotor sectors.

10. The interior permanent magnet motor of claim 8, wherein the rotor sectors include first and second rotor sectors, which are circumferentially adjacent to each other, and a first partition formed in the first rotor sector and a second partition formed in the second rotor sector are circumferentially spaced apart from each other at a predetermined interval and face each other.

11. An interior permanent magnet motor comprising:
a stator having teeth on which a coil is wound;
a rotor rotatably provided inside the stator, the rotor comprising a plurality of rotor sectors arranged circumferentially about the center of the rotor; and
a first recess and a second recess formed between the rotor sectors, wherein a ferrite permanent magnet is embedded in the first recess, and a rare-earth permanent magnet is embedded in the second recess,
wherein the second recess is located radially outward of the first recess, and the size of the second recess is smaller than that of the first recess;

wherein the permanent magnets, which are embedded in the at least two first and second permanent magnet recesses formed between the rotor sectors, are arranged radially about the center of the rotor, wherein the permanent magnets are radially spaced from each other by partitions that protrude circumferentially from side portions of corresponding rotor sectors and which are circumferentially spaced apart from each other while facing each other.

12. The interior permanent magnet motor of claim 11, wherein the width of the second recess is smaller than that of the first recess.

13. The interior permanent magnet motor of claim 11, wherein the first and second recesses are arranged radially about the center of the rotor.

14. The interior permanent magnet motor of claim 13, wherein the partitions that protrude from the side portions of the rotor sectors are provided between the first permanent magnet recess and the second permanent magnet recess.

15. The interior permanent magnet motor of claim 14, wherein the rotor sectors include first and second rotor sectors, which are circumferentially adjacent to each other, and a first partition formed in the first rotor sector and a second partition formed in the second rotor sector are circumferentially spaced apart from each other at a predetermined interval while facing each other.

16. The interior permanent magnet motor of claim 14, wherein the partitions are formed integrally with the rotor sectors.

* * * * *

UNITED STATES PATENT AND TRADEMARK OFFICE
CERTIFICATE OF CORRECTION

| | | |
|---|---|---|
| PATENT NO. | : 9,787,147 B2 | |
| APPLICATION NO. | : 14/358159 | |
| DATED | : October 10, 2017 | |
| INVENTOR(S) | : Deok Geun Kim et al. | |

It is certified that error appears in the above-identified patent and that said Letters Patent is hereby corrected as shown below:

In the Specification

Column 1, Line 9, delete "01197669" and insert -- 0119769 --

In the Claims

Column 9, Line 2, Claim 11, before "first" delete "at least two"

Signed and Sealed this
Sixth Day of February, 2018

Joseph Matal
*Performing the Functions and Duties of the*
*Under Secretary of Commerce for Intellectual Property and*
*Director of the United States Patent and Trademark Office*